(No Model.) 2 Sheets—Sheet 1.
J. C. W. STANLEY.
APPARATUS FOR TREATING FISH AND FISH OFFAL.
No. 541,187. Patented June 18, 1895.
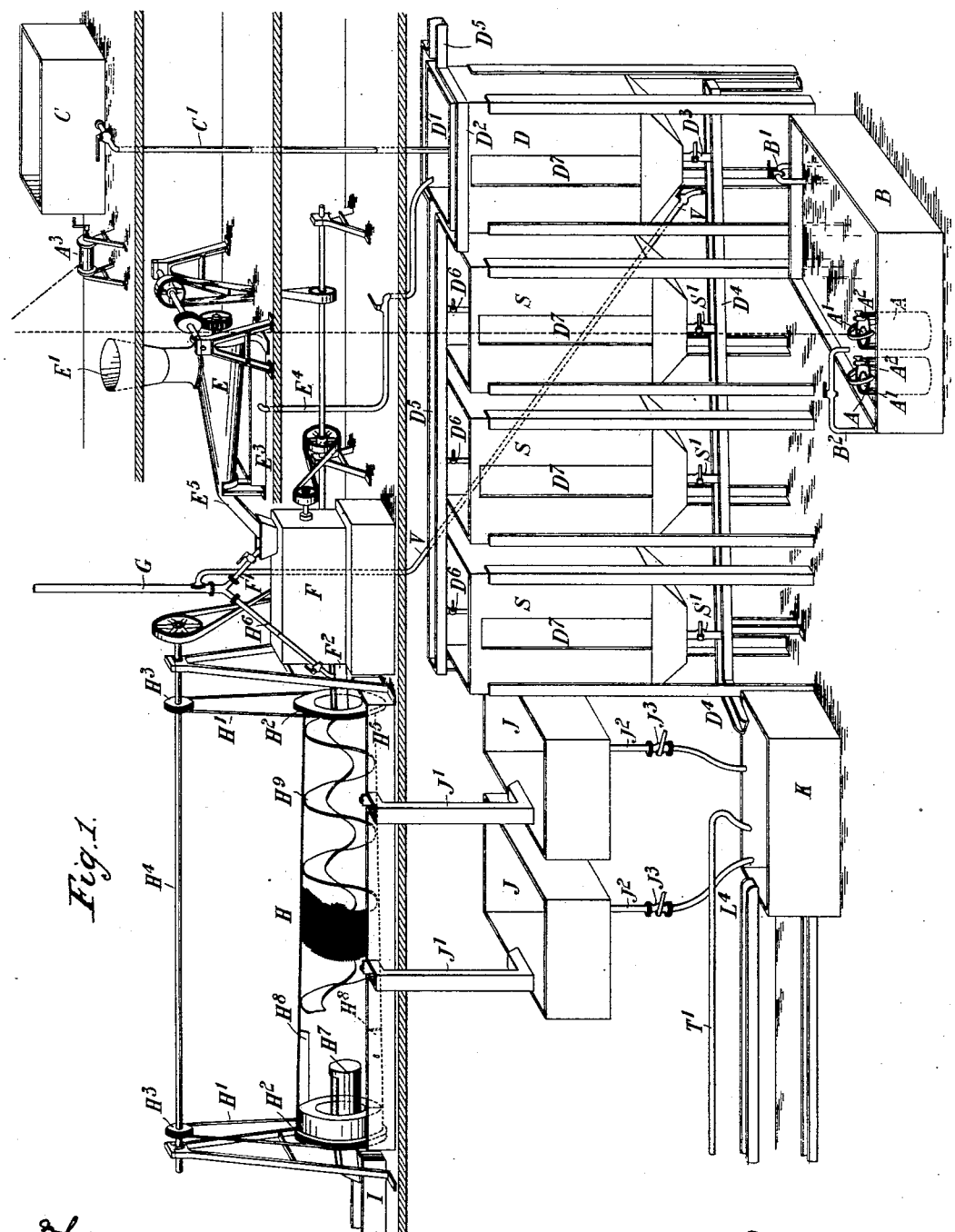

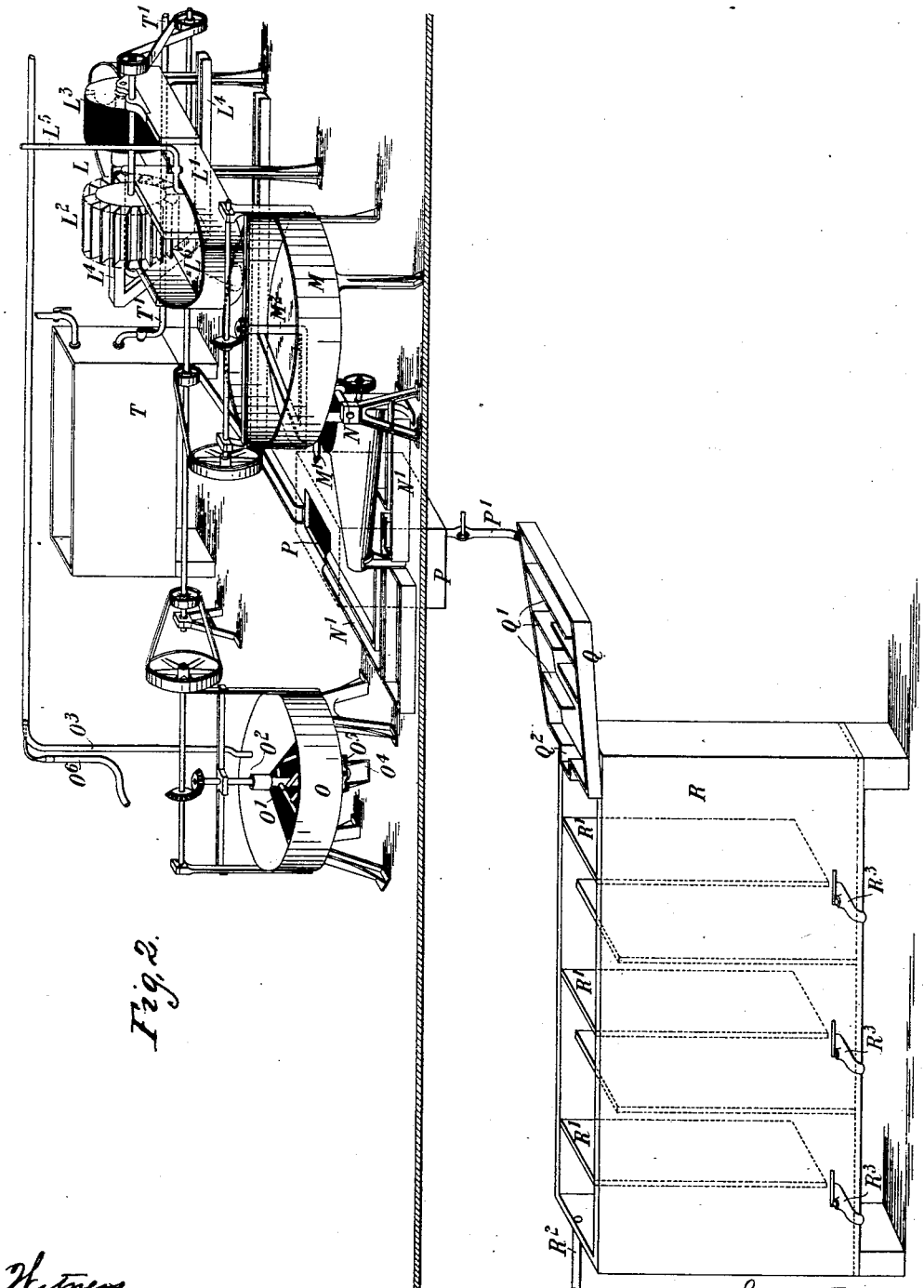

UNITED STATES PATENT OFFICE.

JOHN CHARLES WILLIAM STANLEY, OF LONDON, ENGLAND.

APPARATUS FOR TREATING FISH AND FISH-OFFAL.

SPECIFICATION forming part of Letters Patent No. 541,187, dated June 18, 1895.

Application filed January 3, 1894. Serial No. 495,540. (No model.) Patented in England September 13, 1893, No. 17,205.

*To all whom it may concern:*

Be it known that I, JOHN CHARLES WILLIAM STANLEY, a subject of the Queen of England, residing at London, England, have invented certain new and useful Improvements in Apparatus for the Treatment of Fish and Fish-Offal, (for which I have obtained Letters Patent of Great Britain, No. 17,205, dated September 13, 1893,) of which the following is a specification.

This invention relates to a complete apparatus for the sanitary and economical treatment of fish, fish waste and offal whereby several products of commercial value such as oil, manure, fish glue and cattle food may be obtained.

The invention will be best understood by reference to the accompanying drawings which represent diagrammatically the apparatus employed in carrying out the invention.

Figure 1 is a perspective view indicating diagrammatically a general construction and arrangement of the devices by which one part of my invention is carried into effect, the said devices or apparatus being shown as situated on the floors of two separate rooms, one above the other, this being the preferred arrangement in order to obtain the results hereinafter set forth. Fig. 2 is also a perspective view indicating diagrammatically the several devices for the carrying out of the second part of my improvements, the devices of this figure also being shown as arranged upon the floors of two separate rooms, one above the other.

The fish or fish offal is placed in drums or cases A, Sheet I, into which may be poured water either fresh or salt and if necessary in case the fish is required to be kept for a time before treatment a chemical agent may be added as a deodorizer. The drums or cases are then closed with an air tight lid A', taps or valves $A^2$ being also provided. The drums when ready are placed in a tank or kettle B and the fish is boiled preferably by steam either with the assistance of a jacket or admitted direct to the water in the tank. In the drawings a pipe B' is shown for admitting the steam and another pipe $B^2$ for admitting water both being provided with taps. The boiling is continued until the flesh is entirely cooked when it will readily separate from the bone. If the drums with the fish in require to be stored for any length of time the tap is opened and the air and steam allowed to escape, the contents of the drum being thus prevented from decomposing.

The cooking will free a quantity of oil which can be removed from the drums by decanting, this in the arrangement of apparatus shown in the drawings taking place into the tank C preferably arranged high up in the building, the oil and water passing from the tank C by the pipes C' into the oil tank D on a lower floor. A winch $A^3$ is shown on the top floor for raising the drums as the boiling tank B is shown for convenience located on the bottom floor of the building. The solid matter remaining in the drums after the oil and water have been decanted is poured into the hopper E' of the screw compressing machine E in which the fish is subjected to sufficient pressure to substantially dry it, the liquid expressed escaping into the trough $E^3$ from which by the pipe $E^4$ it flows to the before mentioned oil tank D. The solid matter, consisting for the most part of flesh and bone passes by the chute $E^5$ to the breaking machine or devil F to which water is admitted by the branch F' of the main water supply pipe G, the fish being whirled about and beaten and separated from the bones, both liquid and solid matters, and the water admitted into F flowing by the chute $F^2$ into the revolving drum H formed of wire gauze, perforated zinc or the like. This drum is preferably carried by chains H' passing round pulley flanges $H^2$ upon the ends of the drum and also around pulleys $H^3$ upon a shaft $H^4$ driven by a pulley and belt or in other convenient manner. The drum H is by the chains H' revolved in the trough $H^5$ into which the water and fiber suspended therein flows from the drum through the openings in the gauze. As the fish in the devil F is required to be in a somewhat stiff condition an extra supply of water is provided for the drum H by the branch pipe $H^6$ of the main G. By the arrangement of these two branches $H^6$ and F' each of which is provided with its appropriate cock, the proper consistency of the materials both in the devil F and the drum H can be insured. The bones are caused to travel through the drum by means of an open worm $H^9$ and escape from the drum H by the pipe or tube H⁷ the inner end of which is stopped and the upper portion of the pipe cut away. The bones are lifted by the vanes or paddles H⁸ as the drum revolves and fall into the open top of the said pipe H⁷ the outer end of which delivers them to the chute I, whence they can be collected and dried in any convenient manner.

Instead of the drum H being arranged as above described it may be revolved by the chains H' out of contact with the water in the trough H⁵ water being supplied to the drum by a pipe perforated on its under side and carried along near the top inside the drum, the spraying of the water under pressure having the effect of assisting to beat the fiber clear of the bones. Otherwise the construction and operation of the drum would be substantially the same as that above described and in either case the drum may be provided with a worm or Archimedean screw or equivalent either revolving with the drum or fixed, for the purpose of causing the bones, &c., to travel toward the delivery end of the drum.

The compressing apparatus E above described is composed of a tapered or conical tube or case in which revolves a tapered screw or worm of reducing pitch the effect being to compress the contents of the apparatus toward its delivery and smaller end thus expelling the oil and other liquid or moisture and also forcing out the solid and substantially dry matters at the other end. The fluids escape by perforations in the under side of the body the perforations extending preferably the whole length of the machine.

The devil or disintegrating machine F is of the well-known type used particularly in the manufacture of paper and consists of a casing lined with spikes or knives and a drum or shaft revolving therein and also provided with spikes or knives which pass between those of the casing and thus tear or cut the contents of the apparatus.

From the trough H⁵ the water and fibrous matter suspended therein pass by chutes J' to the strainers J where the fibrous matter is retained in the form of a stiff paste while the water escapes by the pipes J² to the chemical mixing tank K cocks J³ being provided if required upon the pipes J². The strainers J may be variously constructed, but satisfactory results may be obtained by forming them with double walls and bottom the outside walls and bottom being solid and the inner ones perforated thus providing an extensive straining surface. The pipe J² would communicate with the space between these two sets of walls.

In some cases the fibrous material from the strainers J will be in suitable condition to be dried and used for various agricultural and other purposes. In other cases however, it may be desirable to still further purify the fiber from oil and when this is necessary it is conveyed by traveling bands, elevators or other suitable means, to the washer L which may be of the well known construction commonly employed in the manufacture of paper for pulping and washing pulp or fibrous materials. The fibrous material is delivered into the trough L' containing water in which revolve the paddle wheel L² and gauze drum L³. The paddle L² beats and mixes the fiber with the water thus liberating any oil that it may still contain, the oil and the water from the trough L' escaping through the fine mesh of the gauze drum L³ from the interior of which they are lifted by paddles or the like inside the drum to an open-topped pipe L⁴ into which they escape in a manner similar to that described with reference to the open-topped pipe H⁷ of the drum H, the pipe L⁴ entering the drum L³ for this purpose. The pipe or channel L⁴ delivers to the chemical mixing tank K. Water is supplied to the trough L' by the pipe L⁵.

From the washer L the fibrous material in a stiff pasty condition falls through the opening L⁶ into the tray M and from that through an opening in the bottom into the compressor N preferably of similar construction to compressor E already described. The opening in the bottom of the tray M may be controlled by a sliding door M' but the feed is chiefly regulated by the revolving stirrer M² which traveling slowly round prevents the material from settling and causes it to pass through the opening into the compressor N. From the compressor N the fibrous material is delivered by any suitable means—automatic or otherwise—into the closed vessel O (in the drawings a portion of the cover is removed to show the interior) in which it is stirred by the revolving stirring device O' which is made hollow to allow heated or ordinary air to enter by the hollow spindle O² and pass through the stem and arms of the stirrer, escaping by small perforations in the latter into the body of the material in the drier; the circulation of the air being effected either by supplying compressed air at O² or by suction by the pipe O³ which may be connected with a fan or other suction device, or a steam jet O⁶, so as to exhaust the air from the drier O. The drier may be heated or not. When heated it is convenient to form it as a steam jacketed pan but other means may be adopted for the purpose. When the drying operation is completed the contents may be discharged by the chute O⁴ in the bottom, a suitable door or slide O⁵ being provided for closing this chute. The cover or lid may be made in sections or a portion of it may be removable to facilitate the introduction of the material. This or a similar machine may also be employed for drying the bones though the bones and the fiber would not be dried together.

The water expressed by the compressor N falls into the channel N' and gravitates to the chemical mixing tank P from which by the pipe P' it escapes to the precipitating tank R passing first through the tray Q provided with the baffle plates Q' which provide a tortuous passage and prevent the water from traveling too fast. From the tray Q the water passes by the channel $Q^2$ into the precipitating tank R the channel $Q^2$ passing down to somewhere near the bottom of the tank so as to prevent agitation as it enters. The tank R is divided by partitions $R'$ alternately reaching to the top and the bottom so that the water travels under the first partition, and over the second, under the third and so on to the end of the tank finally flowing away by the overflow $R^2$ as a purified effluent. The matter in suspension in the water in its progress through the tank R settles upon the bottom while the water flows over the top of the alternate partitions. The sludge may be drawn off if required by the tap $R^3$ or other suitable means, the water expressed and the sludge dried in any convenient manner. This sludge is of considerable value on account of its manurial properties, and very finely divided condition.

The tank T is intended to provide the supply of chemical precipitating solution to the whole of the apparatus, the pipe $T'$ serving the tank K and another pipe not shown in the drawings supplying tank P.

The object of supplying a chemical to the water in the tanks K and P is to cause precipitation of the matters carried in suspension in the water which if allowed to remain in the water would be a serious loss and might also create a nuisance by rendering the effluent impure. All the outflowing water from the process may be treated in this manner.

Returning now to the oil reservoir D the object of this is to separate on the one hand the oil and some of the water, and on the other hand the fibrous material and particles which may be present and the rest of the water. The oil reservoir is constructed with a weir $D'$ and a channel $D^2$ the oil and some of the water flowing over the weir $D'$ into the channel $D^2$ while the rest of the water and the fibrous matter, &c., therein flow out of the bottom of the tank D by the pipe $D^3$ into the chute or pipe $D^4$ whence they flow to the chemical tank K. The oil and water escaping over the weir $D'$ into the channel $D^2$ pass by the chute $D^5$ to the receiving tanks S of any required dimensions conveniently similar to tank D. The chute $D^5$ extends to all the tanks S a separate pipe and tap $D^6$ being provided for each so that the supply to each may be regulated and each may be shut off as required. Each tank S is also provided with a waste pipe and tap $S'$ at the bottom communicating with the chute $D^4$. The operation is as follows: The oil and water flow gently over the weir $D'$ on account of its great extent, thus allowing the sedimentary matters fibrous and otherwise to fall to the bottom of the tank D while the oil and water flow by the chute $D^5$ to the tanks S in which the oil rises and floats on the surface of the water. When one of the tanks S is sufficiently full the tap $D^6$ is turned off and it is allowed to remain long enough to permit the oil to rise to the surface of the water, after which by opening the tap $S'$ the water is allowed to drain off, the tap being closed as soon as the water is gone and the oil would follow. More water and oil are then admitted by the tap $D^6$ and the process repeated until a sufficiently thick film of oil is floating upon the water when the oil may be skimmed off the surface of the water or allowed to flow away by a suitable channel or the water may first be run off by the tap $S'$ and a chute or channel be placed under the pipe and the oil then allowed to run through the same tap $S'$ into a suitable receptacle; or, if desired each tap $S'$ may be formed as a two-way cock, one way leading to the waste for the water and the other to the oil receptacle. In the drawings a second chute $D^5$ is shown on the right-hand side of the tank D. This would be required in case the tank was constructed to serve a second set of subsidence tanks S.

A water supply pipe V is shown for delivering an extra supply of water into the chute $D^4$ should it be desired to dilute the contents of the chute or to clean the chute.

Each of the reservoirs D and S is preferably provided with a glass panel $D^7$ to enable the contents to be readily seen.

I claim—

1. In the treatment of fish or fish offal the combination of a worm compressor E a devil or disintegrator F perforated drum H straining tanks J and chemical tank K with their respective connections substantially as described.

2. In apparatus for the treatment of fish or fish offal the combination of the washer L feeding tray M worm compressor N drier O chemical tank P and precipitating tray and tank Q R with their respective connections substantially as described.

3. In apparatus for the treatment of fish and fish offal, the combination of the tank or kettle B, the tank C and pipe $C'$, the oil tank D, the compressor E, together with means for operating the same, and the devil or beater together with the revolving washer leading from said devil or beater, substantially as described.

4. In apparatus for the treatment of fish and fish offal, the combination of the washer L, and its paddle wheel and gauze drum, the revolving stirrer and means for operating the same, the drier O, the compressor intermediate of said stirrer and drier, and the series of settling tanks R, substantially as shown and for the purpose described.

In testimony whereof I have hereto set my hand in the presence of the two subscribing witnesses.

JOHN CHARLES WILLIAM STANLEY.

Witnesses:
ALFRED J. BOULT,
HARRY S. BRIDGES.